(12) United States Patent
Sonoda et al.

(10) Patent No.: US 9,988,068 B2
(45) Date of Patent: Jun. 5, 2018

(54) STEERING WHEEL INPUT DEVICE

(71) Applicant: Panasonic Intellectual Property Management Co., Ltd., Osaka (JP)

(72) Inventors: Sho Sonoda, Osaka (JP); Hitokazu Shitanaka, Fukui (JP); Tsuyoshi Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 15/100,644

(22) PCT Filed: Dec. 16, 2014

(86) PCT No.: PCT/JP2014/006255
§ 371 (c)(1),
(2) Date: Jun. 1, 2016

(87) PCT Pub. No.: WO2015/104758
PCT Pub. Date: Jul. 16, 2015

(65) Prior Publication Data
US 2016/0297462 A1   Oct. 13, 2016

(30) Foreign Application Priority Data
Jan. 8, 2014   (JP) ................. 2014-001327

(51) Int. Cl.
H01H 1/64   (2006.01)
H01H 1/66   (2006.01)
(Continued)

(52) U.S. Cl.
CPC .............. B62D 1/046 (2013.01); B60K 37/06 (2013.01); B60K 2350/1008 (2013.01);
(Continued)

(58) Field of Classification Search
CPC ......... B60R 16/027; B60R 16/02; B62D 1/04; B62D 1/046; H01H 13/70; H01H 25/00;
(Continued)

(56) References Cited

U.S. PATENT DOCUMENTS

2005/0098417 A1* 5/2005 Miyako ................. B60K 35/00
200/61.54
2009/0140994 A1 6/2009 Tanaka et al.
(Continued)

FOREIGN PATENT DOCUMENTS

JP   2006-096295   4/2006
JP   2007-290562   11/2007
(Continued)

OTHER PUBLICATIONS

International Search Report of PCT application No. PCT/JP2014/006255 dated Mar. 17, 2015.

*Primary Examiner* — Anthony R. Jimenez
(74) *Attorney, Agent, or Firm* — Greenblum & Bernstein, P.L.C.

(57) ABSTRACT

A steering wheel input device includes a first steering switch disposed on a front face of a steering wheel and a second steering switch disposed on a rear face of the steering wheel. When the second steering switch is operated, an icon corresponding to the second steering switch is displayed on the first steering switch. The steering wheel input device allows various operations to be implemented. Furthermore, an operator can intuitively operate the steering wheel input device.

6 Claims, 9 Drawing Sheets

(51) Int. Cl.

| | | |
|---|---|---|
| *H01H 9/02* | (2006.01) | |
| *H01H 9/06* | (2006.01) | |
| *H01H 13/00* | (2006.01) | |
| *H01H 19/04* | (2006.01) | |
| *H01H 19/08* | (2006.01) | |
| *H01H 21/00* | (2006.01) | |
| *B62D 1/04* | (2006.01) | |
| *B60K 37/06* | (2006.01) | |
| *H01H 25/00* | (2006.01) | |

(52) U.S. Cl.
CPC ........ *B60K 2350/928* (2013.01); *H01H 25/00* (2013.01); *H01H 2217/032* (2013.01); *H01H 2217/038* (2013.01); *H01H 2231/026* (2013.01)

(58) Field of Classification Search
CPC ....... H01H 2217/032; H01H 2217/038; H01H 2231/026; H01H 1/64; H01H 1/66; H01H 9/02; H01H 9/06; H01H 13/00; H01H 19/04; H01H 19/08; H01H 21/00; B60K 37/06; B60K 2350/1008; B60K 2350/928
USPC .................................................... 200/293
See application file for complete search history.

(56) References Cited

U.S. PATENT DOCUMENTS

| | | |
|---|---|---|
| 2009/0164062 A1 | 6/2009 | Aoki et al. |
| 2011/0181538 A1 | 7/2011 | Aono |

FOREIGN PATENT DOCUMENTS

| | | |
|---|---|---|
| JP | 2009-135059 | 6/2009 |
| JP | 2010-152737 | 7/2010 |
| JP | 2012-051490 | 3/2012 |
| JP | 2013-121805 | 6/2013 |

* cited by examiner

STEERING WHEEL INPUT DEVICE

CROSS-REFERENCE TO RELATED APPLICATIONS

This application is a U.S. national stage application of the PCT International Application No. PCT/ JP2014/006255 filed on Dec. 16, 2014, which claims the benefit of foreign priority of Japanese patent application 2014-001327 filed on Jan. 8, 2014, the contents all of which are incorporated herein by reference.

TECHNICAL FIELD

The present invention relates to a steering wheel input device.

BACKGROUND ART

In recent years, a steering switch as a steering wheel input device is widely used to perform operations of a car navigation system, an audio system, an air conditioning system, and the like in a vehicle. The steering wheel input device is connected to a control device which controls the car navigation system, the audio system, and the air conditioning system in the vehicle. The steering wheel input device is disposed on a front face of a steering wheel.

Such a steering wheel input device will be described with reference to FIGS. 8 and 9.

FIG. 8 is a cross-sectional view of steering wheel input device 15. FIG. 9 is an exploded perspective view of conventional steering wheel input device 15.

Steering wheel input device 15 includes circuit board 1, supporting plate 5, movable plate 6, touch sensor 9, display plate 10, lower cover 7, and upper cover 11.

On an upper surface of circuit board 1, control circuit 2 such as a microcomputer, a plurality of light emitting elements 3 such as LEDs (Light Emitting Diodes), and push switch 4 are mounted. Patterns are formed on both the upper surface and a lower surface of circuit board 1. Light emitting elements 3 and push switch 4 are connected to control circuit 2 through the patterns.

Moreover, supporting plate 5 made of a resin is disposed above circuit board 1. A plurality of through-holes 5A are disposed in supporting plate 5. Each of the plurality of through-holes 5A is provided corresponding to each of the plurality of light emitting elements 3. Through-holes 5A penetrate supporting plate 5 in a vertical direction.

Movable plate 6 made of a resin is disposed above supporting plate 5. A plurality of transparent windows 6A are provided in movable plate 6. Transparent windows 6A transmit light in a vertical direction of movable plate 6. Each of the plurality of transparent windows 6A is provided corresponding to each of the plurality of light emitting elements 3. Light emitted from light emitting elements 3 passes upward from circuit board 1 through through-holes 5A and transparent windows 6A. Rod-shaped shaft 8 is inserted at one end of movable plate 6.

Circuit board 1, supporting plate 5, and movable plate 6 are disposed on lower cover 7. Bearing 7A is disposed on lower cover 7. Bearing 7A retains shaft 8 of movable plate 6. With this configuration, movable plate 6 can tilt with shaft 8 as a supporting point. Push switch 4 is pressed by the tilt of movable plate 6 and thus is switched between on and off.

Moreover, touch sensor 9 is disposed above transparent windows 6A provided in movable plate 6. Touch sensor 9 includes wiring cable 9A, and wiring cable 9A extends from touch sensor 9. Wiring cable 9A is connected to control circuit 2 in circuit board 1. When an operator touches touch sensor 9, control circuit 2 detects that touch sensor 9 is operated.

Display plate 10 is disposed above touch sensor 9. A plurality of operation parts 10A and a plurality of translucent parts 10B are disposed in display plate 10. Each of the plurality of operation parts 10A is provided corresponding to each of the plurality of light emitting elements 3. Translucent parts 10B respectively corresponding to operation parts 10A are disposed near operation parts 10A.

Upper cover 11 has hole part 11A. Upper cover 11 covers display plate 10 such that display plate 10 is exposed through hole part 11A. As described above, steering wheel input device 15 is configured.

Steering wheel input device 15 configured in this manner is disposed on a front face of a steering wheel of a vehicle such that display plate 10 is exposed.

When the operator touches one of the plurality of operation parts 10A, control circuit 2 detects a position where the touching operation is performed on touch sensor 9. Control circuit 2 controls such that light emitting element 3 corresponding to the operated operation parts 10A emits light, to allow translucent part 10B near the operated operation parts 10A to emit light. Further, when the operator pushes display plate 10, movable plate 6 is tilted and push switch 4 is turned on. Then, control circuit 2 outputs a signal corresponding to the operated operation part 9A to the control device connected to steering wheel input device 15.

Note that, for example, PTL 1 is known as information on prior art documents similar to the invention of this application.

CITATION LIST

Patent Literature

PTL 1: Unexamined Japanese Patent Publication No. 2009-135059

SUMMARY OF THE INVENTION

A steering wheel input device includes a first steering switch disposed on a front face of a steering wheel and a second steering switch disposed on a rear face of the steering wheel. When the second steering switch is operated, an icon corresponding to the second steering switch is displayed on the first steering switch.

This steering wheel input device allows various operations to be implemented. Moreover, an operator can intuitively operate the steering wheel input device.

DESCRIPTION OF EMBODIMENT

Hereinafter, an exemplary embodiment of the present invention (referred to as "the present exemplary embodiment" hereafter) will be described. Here, the present exemplary embodiment described below is an example of the present invention, and is not limited to the scope of the present invention.

(1. Exemplary Embodiment)
(1-1. Outline)

By using a steering wheel input device of the present exemplary embodiment, electronic devices in a vehicle such as an audio system, a car navigation system, an air conditioning system, and a phone can be operated.

Figure 1:
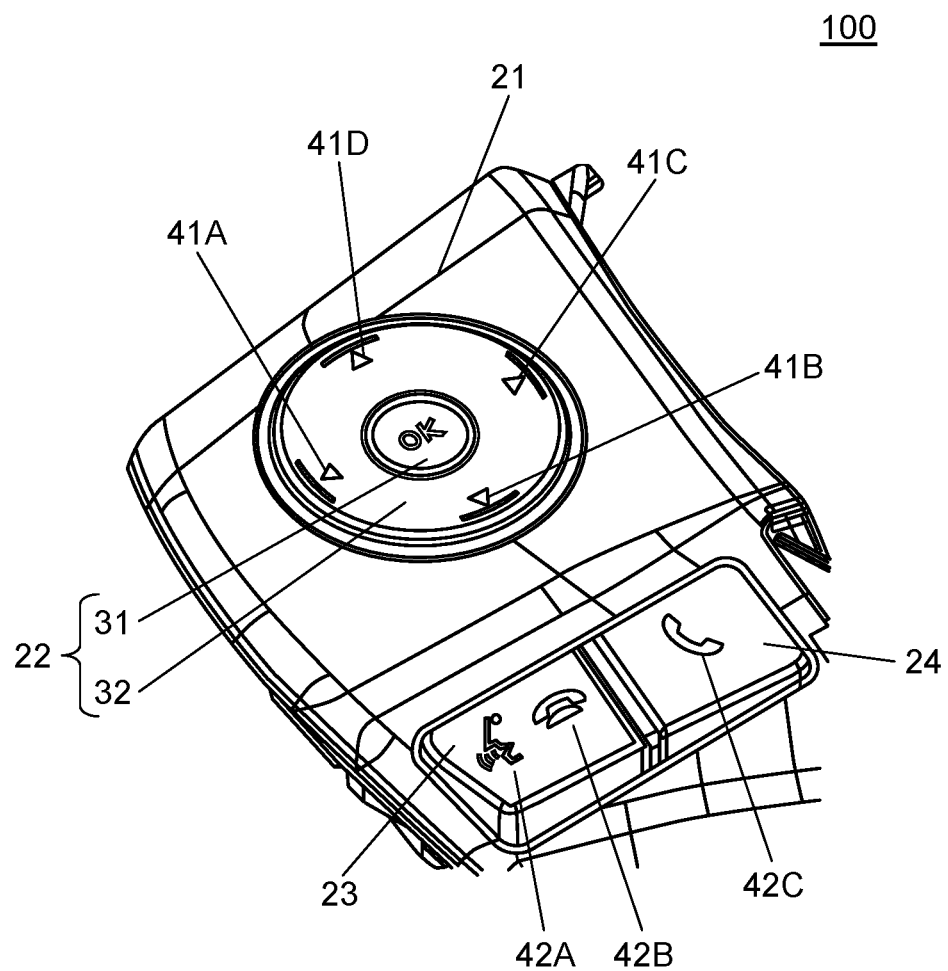
FIG. 1 is a perspective view of a steering wheel input device, according to an exemplary embodiment of the present invention, viewed from a front face side of a steering wheel, illustrating a first steering switch.
Figure 2:
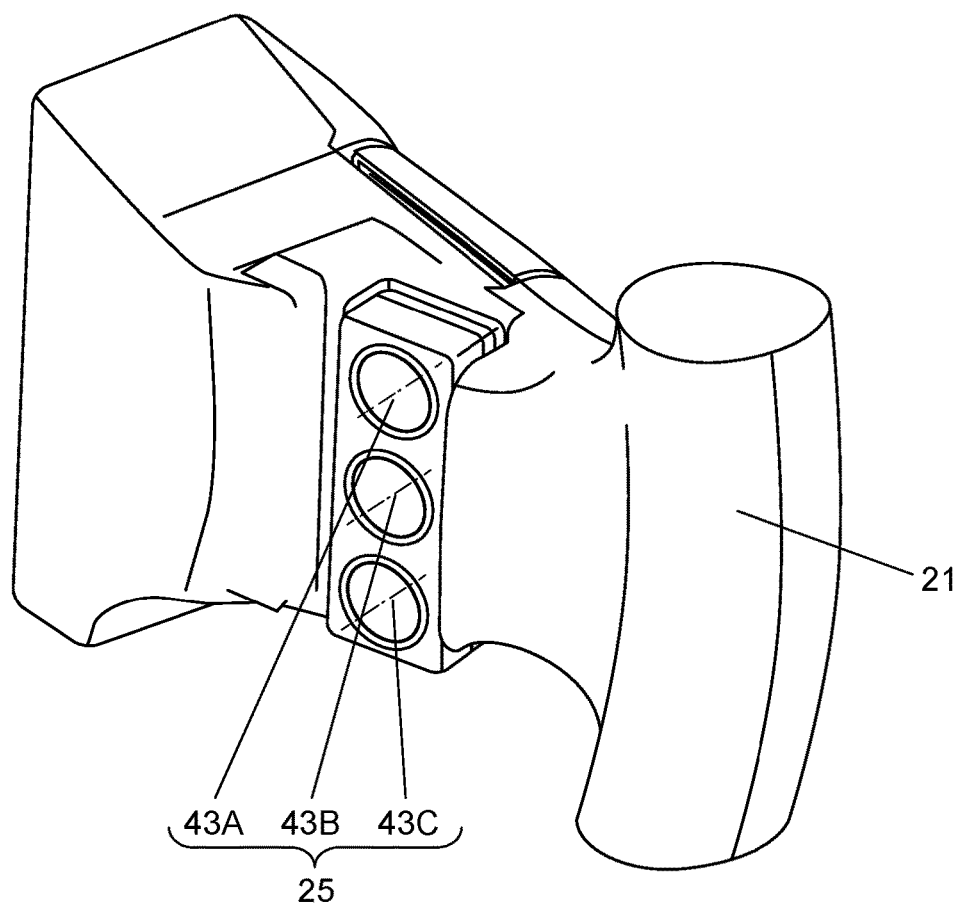
FIG. 2 is a perspective view of the steering wheel input device of the present exemplary embodiment viewed from a rear face side of the steering wheel, illustrating a second steering switch.

FIG. 1 is a perspective view of steering wheel input device 100 viewed from a front face side of steering wheel 21. FIG. 2 is a perspective view of steering wheel input device 100 viewed from a rear face side of steering wheel 21. Steering wheel input device 100 includes first steering switch 22 in FIG. 1 and second steering switch 25 in FIG. 2.

In the present exemplary embodiment, when second steering switch 25 is operated, icons 41A to 41D displayed on first steering switch 22 are changed to icons (icons 71A to 71C in FIG. 5C) which correspond to second steering switch 25.

In this manner, according to the present exemplary embodiment, various operations are implemented by using first steering switch 22 and second steering switch 25. A number of icons displayed at the same time can be reduced even for implementation of the various operations, which allows the operator's intuitive operation. Furthermore, by visually recognizing first steering switch 22 disposed on a front face of steering wheel 21, the operator can intuitively operate second steering switch 25 disposed on a rear face of steering wheel 21.

(1-2. Configuration)

Hereinafter, an entire configuration of steering wheel input device 100 of the present exemplary embodiment and mechanisms linked with steering wheel input device 100 will be described.

Figure 3:
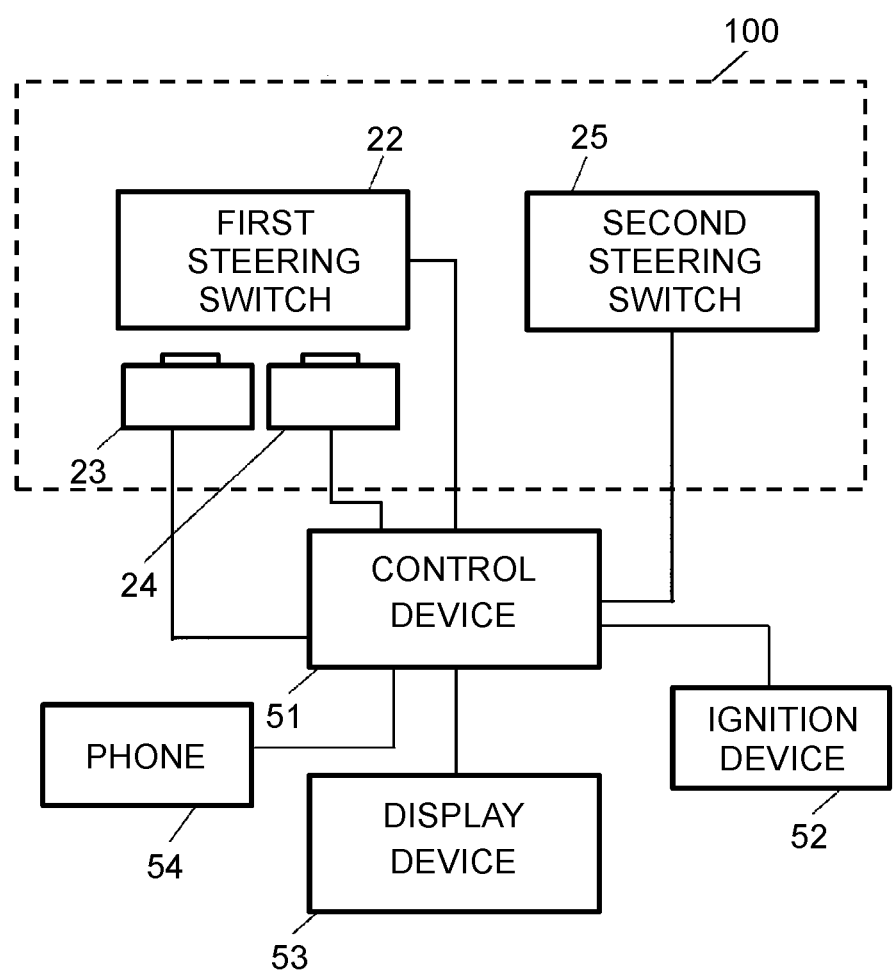
FIG. 3 is a block diagram illustrating a configuration of an entire system including the steering wheel input device of the present exemplary embodiment and mechanisms associated with the steering wheel input device.

FIG. 3 is a block diagram illustrating a configuration of an entire system including steering wheel input device 100 and the mechanisms linked with steering wheel input device 100. The mechanisms linked with steering wheel input device 100 include control device 51, ignition device 52, display device 53, and phone 54. Control device 51 may be included in steering wheel input device 100. Steering wheel input device 100, control device 51, ignition device 52, and display device 53 are mounted on the vehicle. Phone 54 is carried in the vehicle.

Steering wheel input device 100 includes first steering switch 22, second steering switch 25, and push buttons 23 and 24. First steering switch 22, second steering switch 25, and push buttons 23 and 24 are connected to control device 51. Details will be described later.

Ignition device 52 is a device for starting an engine of the vehicle. By using an ignition key or an ignition switch, ignition device 52 can be switched between on and off.

Figure 4:
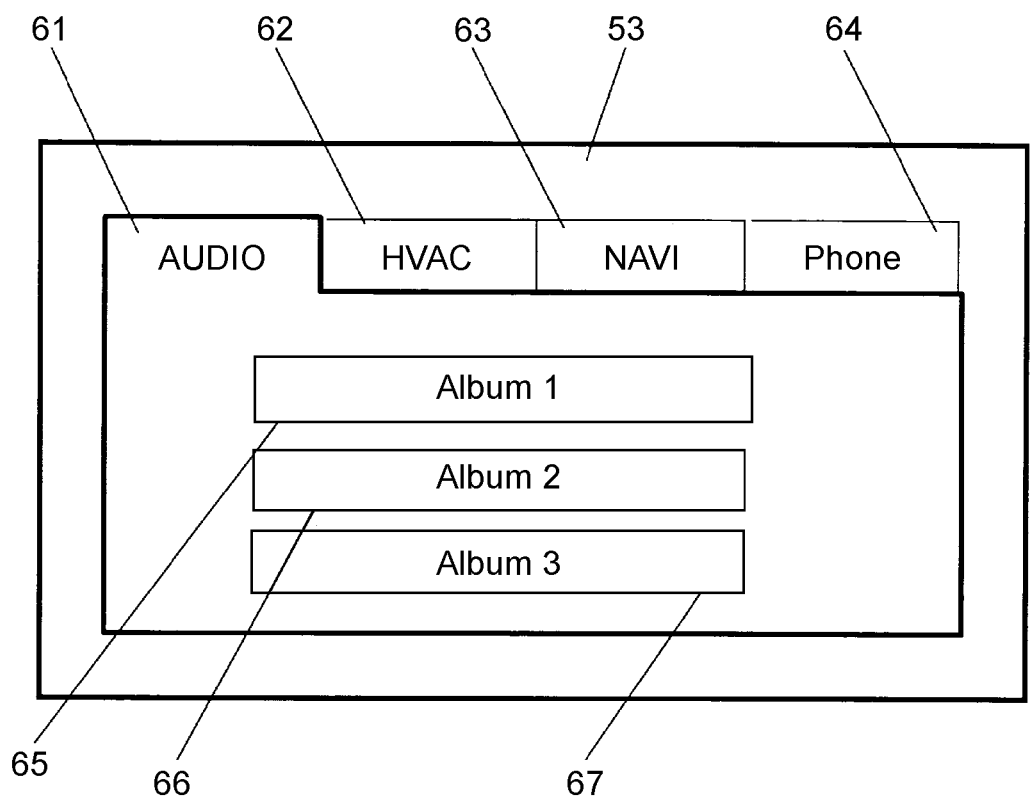
FIG. 4 illustrates a change of a screen of a display device when the steering wheel input device of the present exemplary embodiment is operated.

Display device 53 includes a screen such as a liquid crystal display, a plasma display, and an organic EL (Electro-Luminescence) display. Display device 53 can display characters and graphics on the screen thereof. For example, predetermined menu displays 65 to 67 as illustrated in FIG. 4 are displayed on the screen of display device 53. The operator can operate display device 53 by using steering wheel input device 100 and the like.

Phone 54 is a cellular phone which is carried in the vehicle. Phone 54 is used together with steering wheel input device 100. Phone 54 is connected to control device 51 by using infrared, Bluetooth (registered trademark), a universal serial bus (USB) cable, and the like.

Control device 51 includes an integrated circuit (IC), a microcomputer, and the like. Control device 51 is connected to steering wheel input device 100. When the operator operates any one of first steering switch 22, second steering switch 25, and push buttons 23 and 24, control device 51 detects the operator's operation. Control device 51 then controls behavior of steering wheel input device 100. Control device 51 is connected to the audio system, the car navigation system, and the air conditioning system in the vehicle, and controls these systems. Moreover, control device 51 is connected to ignition device 52. Control device 51 can determine whether ignition device 52 is an on state or an off state, by detecting a signal output from ignition device 52. Moreover, control device 51 is also connected to display device 53. Further, control device 51 is also connected to phone 54. Control device 51 controls push buttons 23 and 24 based on a state of phone 54.

Hereinafter, a configuration of steering wheel input device 100 will be described in detail.

As illustrated in FIG. 1, first steering switch 22 and push buttons 23, 24 are disposed on the front face of steering wheel 21.

First steering switch 22 includes decision operation part 31 and selection operation part 32.

Decision operation part 31 has a circular-shape. Decision operation part 31 is disposed at a center of first steering switch 22. Decision operation part 31 can display characters on a surface thereof.

Selection operation part 32 has a ring-shape. Selection operation part 32 is disposed around decision operation part 31. Selection operation part 32 can display icons on a surface thereof.

As illustrated in FIG. 2, second steering switch 25 is disposed on the rear face of steering wheel 21.

Second steering switch 25 includes a plurality of pressing parts 43A to 43C.

Each of pressing parts 43A to 43C has a circular-shape. Pressing operation can be performed with pressing parts 43A to 43C. Moreover, in the present exemplary embodiment, pressing parts 43A to 43C are switches capable of detecting a two-stage pressing operation. Pressing parts 43A to 43C of the present exemplary embodiment each have a configuration in which a membrane switch and a push switch using a diaphragm are stacked each other. The diaphragm switch is a push switch using a doom-like metallic thin plate as a movable contact. Note that, pressing parts 43A to 43C each may have a configuration other than the above-described configuration, and may be one push switch capable of performing a two-stage pressing operation. Alternatively, pressing parts 43A to 43C each may have a configuration in which a push switch is combined with an electrostatic capacitive type detection means. In this case, the detection means of the electrostatic capacitive detection type detects the touching operation to pressing parts 43A to 43C performed by the operator as a first-stage operation. Then, the push switch detects the pressing operation to pressing parts 43A to 43C as a second-stage operation. Note that, the electrostatic capacitive type detection means is, for example, a touch sensor such as a touch panel. Control device 51 detects whether pressing operation to pressing parts 43A to 43C is performed up to the first stage or the second stage.

Push buttons 23, 24 each are configured with a pressing detection type button. Push button 23 can display icons and characters on a surface thereof. Push button 23 is disposed near first steering switch 22, on the front face of the steering wheel. Push button 23 is linked with phone 54.

Push button 24 can display icons and characters on a surface thereof. In the same way as push button 23, push button 24 is disposed near first steering switch 22, on the front face of steering wheel 21. Push button 24 is linked with phone 54.

(1-3. Operations)

Hereinafter, operations of steering wheel input device 100 will be described.

First, operations of first steering switch 22 and second steering switch 25 will be described.

Figure 5A:
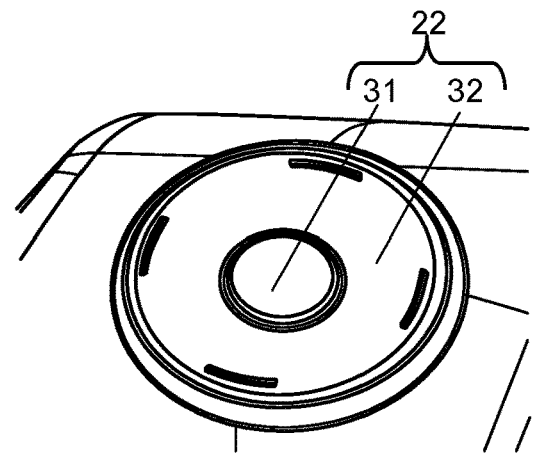
FIG. 5A is a perspective view illustrating a change in display of the first steering switch of the steering wheel input device of the present exemplary embodiment.
Figure 5B:
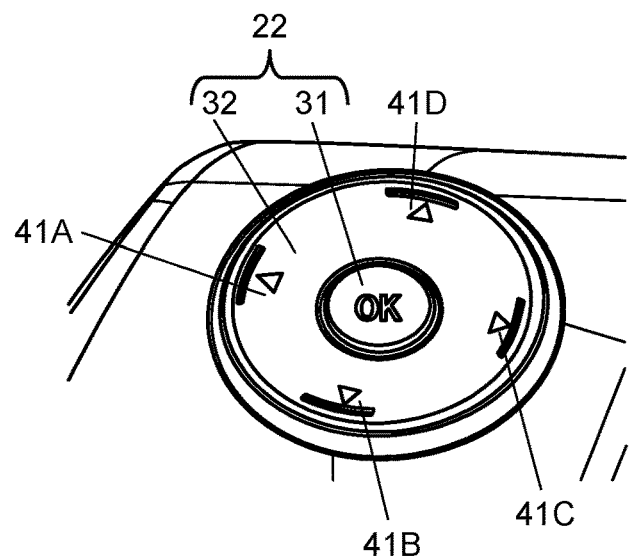
FIG. 5B is a perspective view illustrating a change in display of the first steering switch of the steering wheel input device of the present exemplary embodiment.
Figure 5C:
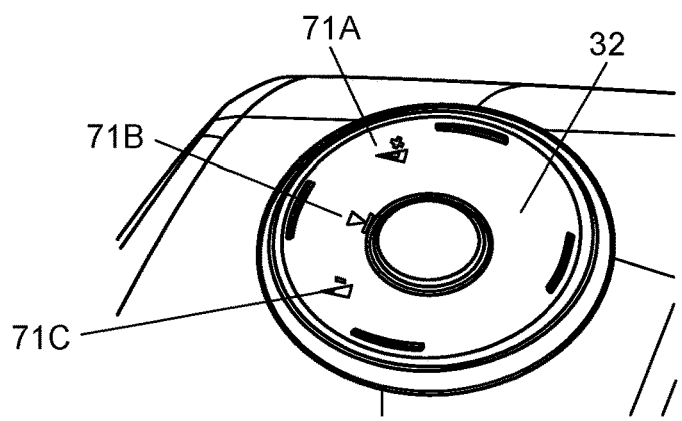
FIG. 5C is a perspective view illustrating a change in display of the first steering switch of the steering wheel input device of the present exemplary embodiment.

FIG. 4 illustrates an example of menu displays 65 to 67 on display device 53. FIGS. 5A to 5C are perspective views each illustrating a change in display of first steering switch 22. FIG. 5A illustrates a display when ignition device 52 is an off state. FIG. 5B illustrates a display when ignition device 52 is turned on. FIG. 5C illustrates a display when second steering switch 25 is operated.

As illustrated in FIG. 5A, when ignition device 52 is an off state, first steering switch 22 is in an unlit state and nothing is displayed on both surfaces of decision operation part 31 and selection operation part 32.

Next, when ignition device 52 is turned on, first steering switch 22 is brought into a lit state. Decision operation part 31 is controlled by control device 51, to display characters "OK" on the surface thereof, as illustrated in FIG. 5B. Moreover, selection operation part 32 is controlled by control device 51, to display icons 41A to 41D on the surface thereof. Each of icons 41A to 41D has a triangular shape.

Icons 41A to 41D are respectively disposed in four orthogonal directions. In addition, when ignition device 52 is turned on, the screen of display device 53 is brought into a state in which tab 61 indicating "AUDIO" is selected, as illustrated in FIG. 4.

Furthermore, under a state in which icons 41A to 41D are displayed on first steering switch 22 as illustrated in FIG. 5B, a surface of icon 41C is pressed, for example. Then, display device 53 in FIG. 4 is changed from the state in which tab 61 indicating "AUDIO" is selected to a state in which tab 62 indicating "HVAC" is selected. When the surface of icon 41C is further pressed, the state in which tab 62 indicating "HVAC" is selected is sequentially changed to a state in which tab 63 indicating "NAVI" is selected, and to a state in which tab 64 indicating "Phone" is selected. When a surface of icon 41A is pressed under the state in which tab 62 indicating "HVAC" is selected, the state is changed to the state in which tab 61 indicating "AUDIO" is selected.

Here, when a surface of icon 41B is pressed, for example, under a state in which menu display 66 indicating "Album2" is selected in tab 61 indicating "AUDIO", the state is changed to a state in which menu display 67 indicating "Album3" is selected. When an upper surface of icon 41D is pressed under the state in which menu display 66 indicating "Album2" is selected, the state is changed to a state in which menu display 65 indicating "Album1" is selected. Furthermore, when decision operation part 31 in FIG. 1 is pressed under the state in which menu display 65 indicating "Album1" is selected, decision is actually made. Once "Album1" is decided, control device 51 controls the audio system to reproduce "Album1".

Next, as illustrated in FIG. 5B, second steering switch 25 provided on the rear face is operated under the state in which icons 41A to 41D are displayed on selection operation part 32. That is, any one of pressing parts 43A to 43C in FIG. 2 is pressed up to the first stage. Control device 51 then detects that the one of pressing parts 43A to 43C is pressed up to the first stage, and controls selection operation part 32. Icons 71A to 71C in FIG. 5C are then displayed on selection operation part 32. Icon 71A corresponds to pressing part 43A. Icon 71B corresponds to pressing part 43B. Icon 71C corresponds to pressing part 43C. That is, the operator can grasp a positional relationship of pressing parts 43A to 43C by visually recognizing a positional relationship of icons 71A to 71C. Moreover, the operator can intuitively grasp what operation is performed when each of pressing parts 43A to 43C is pressed, by visually recognizing signs of icons 71A to 71C. Here, with respect to the signs, icon 71A, icon 71C, and icon 71B indicate an increase in sound volume, a decrease in sound volume, and a skip of a musical piece, respectively. Under the state in which icons 71A to 71C are displayed on selection operation part 32, if pressing part 43A is pressed up to the second stage, sound volume is increased; if pressing part 43C is pressed up to the second stage, the sound volume is decreased; and if pressing part 43B is pressed up to the second stage, a musical piece under reproducing is skipped to a next musical piece.

Next, operations of push buttons 23, 24 will be described below.

FIGS. 6A, 6B, 7A, and 7B each illustrates a change in display of push buttons 23, 24.

Figure 6A:
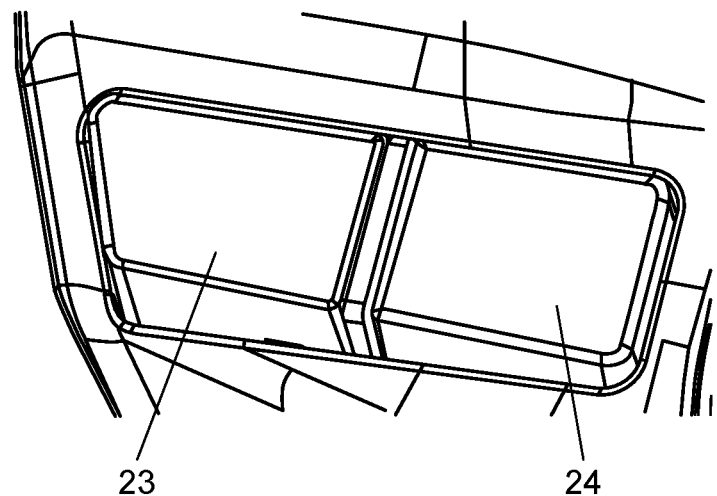
FIG. 6A is a perspective view illustrating a change in display of a push button of the steering wheel input device of the present exemplary embodiment.
Figure 6B:
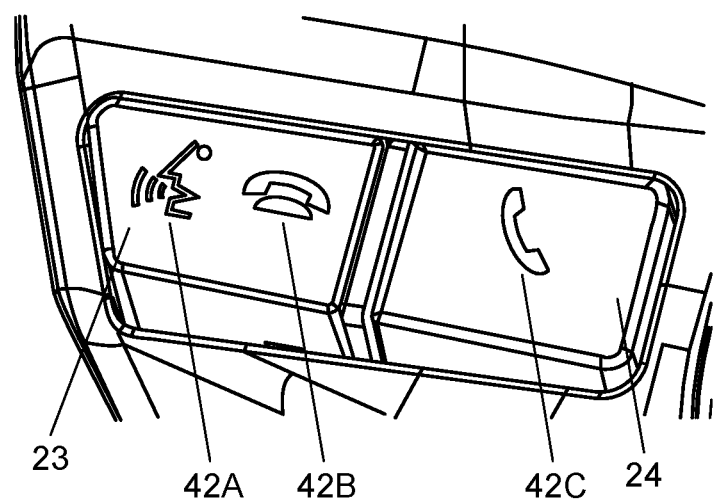
FIG. 6B is a perspective view illustrating a change in display of the push button of the steering wheel input device of the present exemplary embodiment.
Figure 7A:
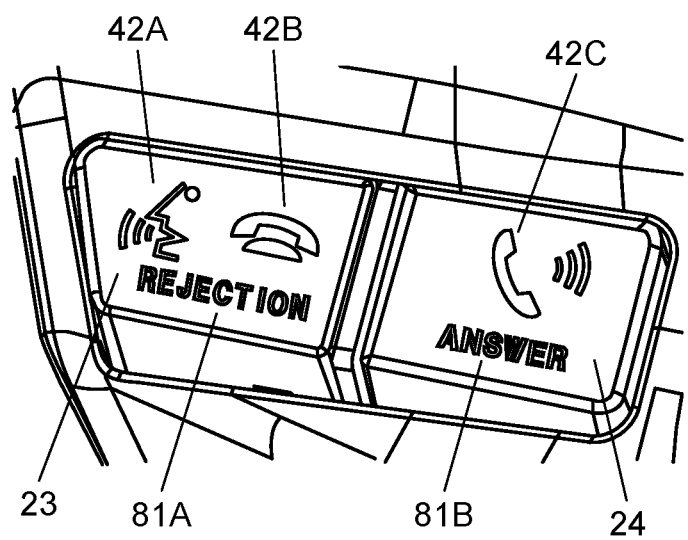
FIG. 7A is a perspective view illustrating a change in display of the push button of the steering wheel input device of the present exemplary embodiment.

FIG. 6A illustrates displays of push buttons 23, 24 when ignition device 52 is an off state. FIG. 6B illustrates displays of push buttons 23, 24 when ignition device 52 is turned on. FIG. 7A illustrates displays when an incoming call is received by phone 54 under the state illustrated in FIG. 6B.

Figure 7B:
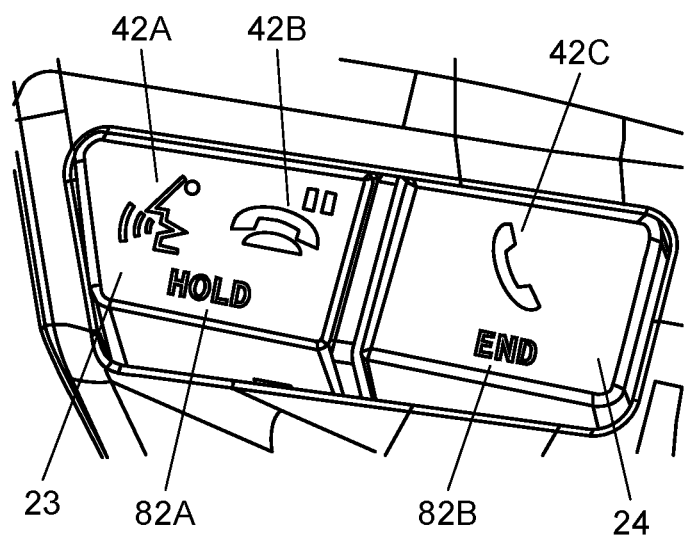
FIG. 7B is a perspective view illustrating a change in display of the push button of the steering wheel input device of the present exemplary embodiment.

FIG. 7B illustrates displays when the state illustrated in FIG. 7A is changed to a state during which speech communication is performed.

As illustrated in FIG. 6A, when ignition device 52 is an off state, push buttons 23, 24 are in an unlit state and nothing is displayed on surfaces thereof.

Under the state illustrated in FIG. 6A, when ignition device 52 is turned on, control device 51 controls push buttons 23, 24 to be a lit state. Then, as illustrated in FIG. 6B, icons 42A, 42B are displayed on the surface of push button 23, and icon 42C is displayed on the surface of push button 24.

Moreover, under the state illustrated in FIG. 6B, if phone 54 receives a call from an external phone, the displays of push buttons 23, 24 are changed as illustrated in FIG. 7A. Specifically, character display 81A indicating "REJECTION" is displayed on the surface of push button 23. Character display 81B indicating "ANSWER" is displayed on the surface of push button 24. Here, character display 81A indicating "REJECTION" represents a refusal. Character display 81B indicating "ANSWER" represents a response. Pressing push button 23 disconnects the speech communication, while pressing push button 24 brings about a speech communication state. When push button 24 is pressed, in the displays on push buttons 23 and 24, the displayed characters in FIG. 7A are changed to characters illustrated in FIG. 7B.

Here, in FIG. 7B, character display 82A indicating "HOLD" on push button 23 represents a call hold function. Character display 82B indicating "END" on push button 24 represents a termination of speech communication. Under a state during which the operator performs speech communication by using phone 54, pressing push button 23 holds the speech communication, and pressing push button 24 terminates the speech communication.

Here, in the present exemplary embodiment, character displays 81A, 81B on push buttons 23, 24 are changed to displays 82A, 82B when speech communication is performed by using phone 54, but certain character displays may be changed to character displays 81A, 81B when an incoming call is received by phone 54. Moreover, the character displays may be changed both when an incoming call is received by phone 54 and when speech communication is performed by using phone 54.

(1-4. Conclusion)

Figure 8:
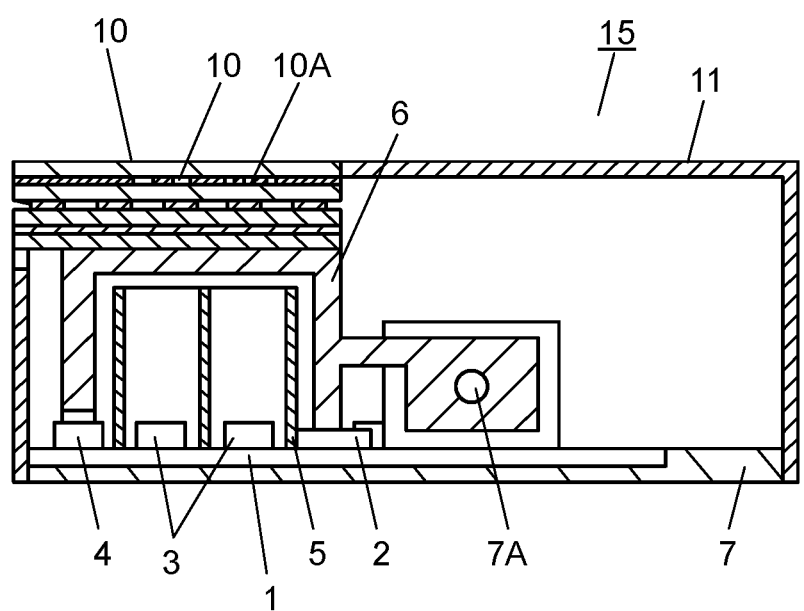
FIG. 8 is a cross-sectional view of a steering wheel input device used for comparison.
Figure 9:
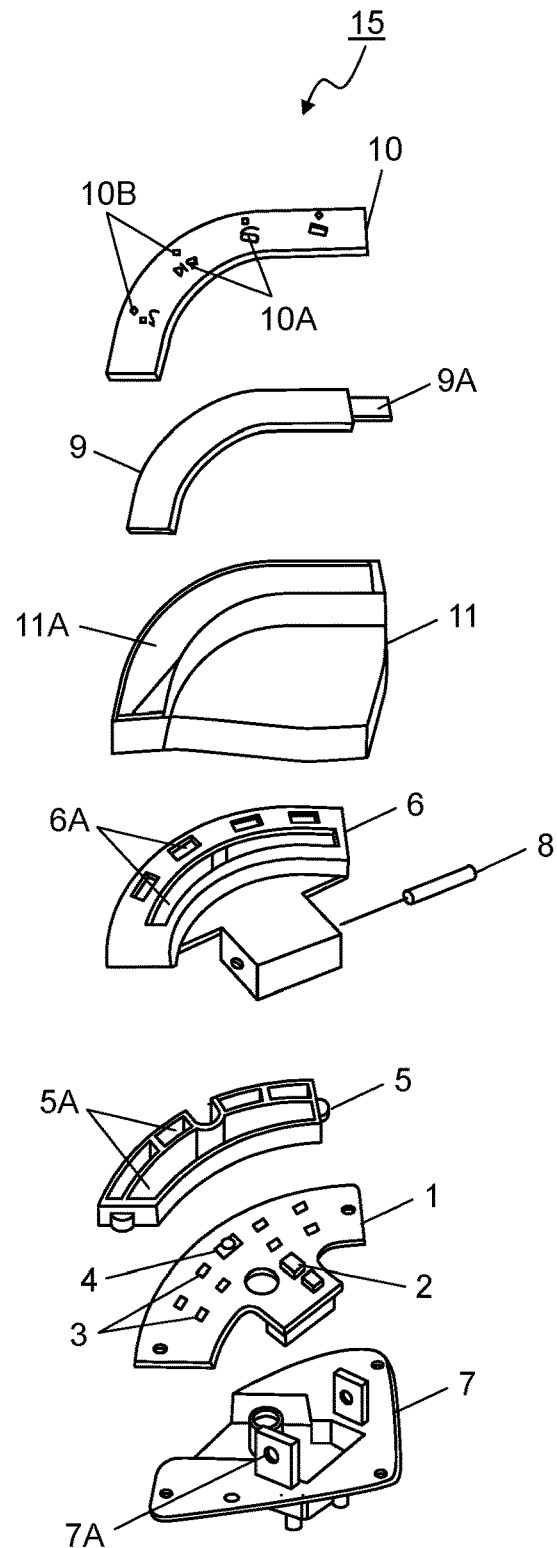
FIG. 9 is an exploded perspective view of the steering wheel input device used for comparison.

Steering wheel input device 15 used for comparison as illustrated in FIGS. 8, 9 performs operations of the various electronic devices by using only operation parts 10A disposed on the front face of the steering wheel. Therefore, a limited number of operations are performed. Furthermore, even if a plurality of steering wheel input devices 15 are disposed on the steering wheel, it is difficult to quickly understand what functions are allocated. In contrast, according to the present exemplary embodiment, when second steering switch 25 disposed on the rear face of steering wheel 21 is operated, icons 71A to 71C corresponding to second steering switch 25 are displayed on first steering switch 22 disposed on the front face of steering wheel 21. With this configuration, various operations which are impossible to be handled by using only first steering switch 22 become possible to be handled by using first steering switch 22 and second steering switch 25. Furthermore, by visually recognizing first steering switch 22 disposed on the front face of the steering wheel, the operations of second steering switch 25 disposed on the rear face of the steering wheel can be intuitively performed.

In the present exemplary embodiment, various functions of steering wheel input device 100 can gradually be displayed. Therefore, the operator can easily understand what functions are allocated to steering wheel input device 100. Accordingly, intuitive operations can be performed.

Moreover, second steering switch 25 includes the plurality of pressing parts 43A to 43C. Even when any one of pressing parts 43A to 43C is operated, icons 71A to 71C are displayed on first steering switch 22, including icons 71A to 71C corresponding to other remaining pressing parts 43A to 43C which are not operated. With this configuration, even though second steering switch 25 includes the plurality of pressing parts 43A to 43C, possibility in which pressing parts 43A to 43C are mistakenly pressed can be lowered. Here, although three pressing parts 43A to 43C are provided in the present exemplary embodiment, the number of pressing parts is not limited to three.

Moreover, in the present exemplary embodiment, pressing parts 43A to 43C can be pressed in the two stages. With this configuration, various operations are allowed to be implemented. Here, pressing parts 43A to 43C may be pressed in three or more stages. Moreover, the operation to pressing parts 43A to 43C is not limited to the pressing operation, but may be an operation having the two or more stages by combining the pressing operation with the touching operation and the like.

Moreover, in the present exemplary embodiment, first steering switch 22 is in an unlit state when ignition device 52 is an off state, and is brought into a lit state when ignition device 52 is turned on. Such operations can enhance appearance of steering wheel input device 100, and can make an interior of a vehicle look better.

Moreover, in the present exemplary embodiment, push buttons 23, 24 are disposed around first steering switch 22. With this configuration, the present exemplary embodiment allows more various operations to be implemented.

Moreover, in the present exemplary embodiment, push buttons 23, 24 can display characters. Character displays are changed at least either when an incoming call is received by the phone or when speech communication is performed by using the phone. With this configuration, the present exemplary embodiment can provide improved operability.

Moreover, in the present exemplary embodiment, first steering switch 22 includes decision operation part 31 and selection operation part 32 disposed around decision operation part 31. With this configuration, operability of the operator can be improved because of a smaller area. Furthermore, a surrounding area of decision operation part 31 is made to be one wide area. By utilizing this area, icons 71A to 71C corresponding to second steering switch 25 can be displayed.

INDUSTRIAL APPLICABILITY

A steering wheel input device according to the present invention has an advantageous effect in which various operations can be performed intuitively, and is useful primarily for an on-board system.

REFERENCE MARKS IN THE DRAWINGS 21 steering wheel
22 first steering switch
23, 24 push button
25 second steering switch
31 decision operation part
32 selection operation part 41A, 41B, 41C, 41D icon
42A, 42B, 42C icon
71A icon (first icon)
71B icon (second icon)
71C icon
43A, 43B, 43C pressing part
51 control device
52 ignition device
53 display device
61, 62, 63, 64 tab
65, 66, 67 menu display
81A, 81B, 82A, 82B character display
100 steering wheel input device

What is claimed is:

1. A steering wheel input device comprising:
a first steering switch disposed on a front face of a steering wheel;
a second steering switch disposed on a rear face of the steering wheel;
a first switch icon corresponding to the first steering switch; and
a second switch icon corresponding to the second steering switch, wherein
the second switch icon corresponding to the second steering switch is displayed on the first steering switch only when the second steering switch is operated,
the second steering switch includes a first pressing part and a second pressing part,
the second switch icon includes a first icon corresponding to the first pressing part and a second icon corresponding to the second pressing part, and
both the first icon and the second icon are displayed on the first steering switch when either the first pressing part or the second pressing part is operated.

2. The steering wheel input device according to claim 1, wherein the first pressing part and the second pressing part are each operable in a plurality of stages.

3. The steering wheel input device according to claim 1, wherein
the steering wheel input device is disposed in a vehicle provided with an ignition device, and
the first steering switch is switchable between a lit state and an unlit state and the first steering switch is in the unlit state when the ignition device is in an off state, and is brought into the lit state when the ignition device is turned on.

4. The steering wheel input device according to claim 1, wherein
the first steering switch includes a decision operation part and a selection operation part disposed around the decision operation part.

5. The steering wheel input device according to claim 1, further comprising:
a push button disposed around the first steering switch.

6. The steering wheel input device according to claim 5, wherein
the steering wheel input device is used together with a phone, and
the push button is configured to display characters, and the characters being displayed are changed at least either when an incoming call is received by the phone or when speech communication is performed by using the phone.

\* \* \* \* \*